Sept. 26, 1939.  C. E. KRAUS  2,173,848
CUTTER AND BLADE THEREFOR
Filed Dec. 27, 1937  2 Sheets-Sheet 1
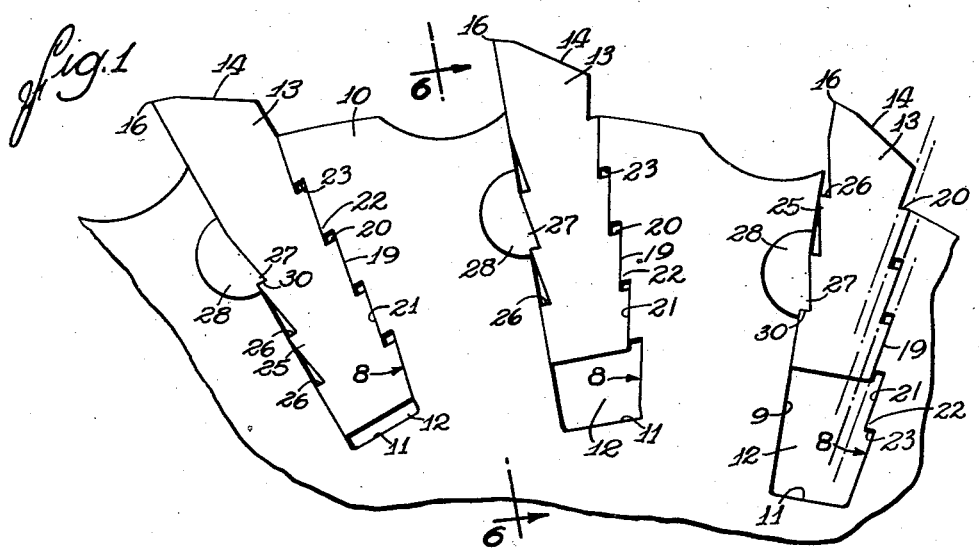
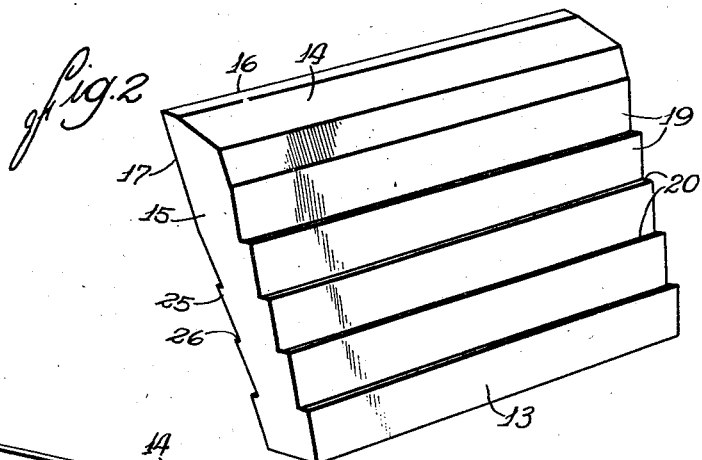
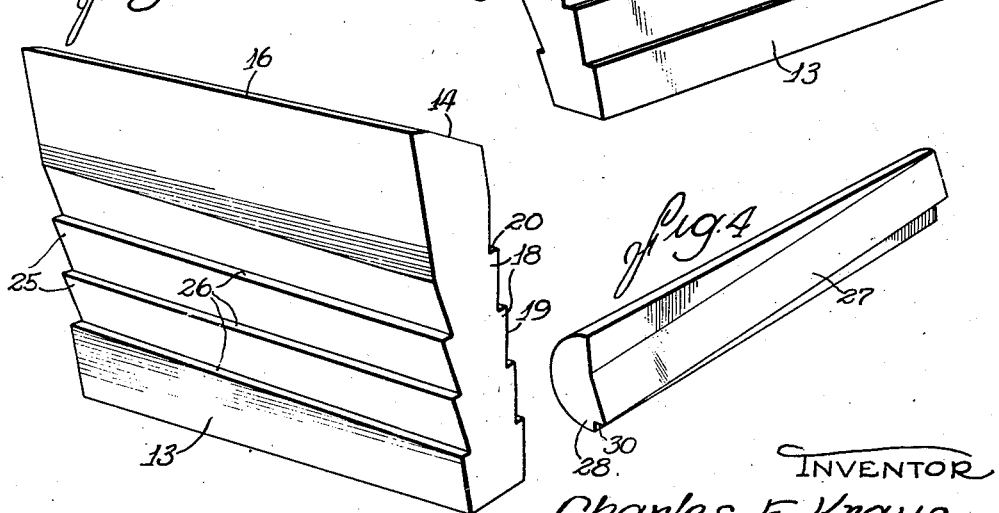
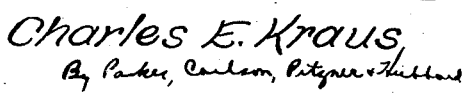
INVENTOR
Charles E. Kraus
By Parker, Carlson, Pitzner & Hubbard
ATTORNEYS Sept. 26, 1939.                C. E. KRAUS                 2,173,848
                        CUTTER AND BLADE THEREFOR
                   Filed Dec. 27, 1937     2 Sheets-Sheet 2
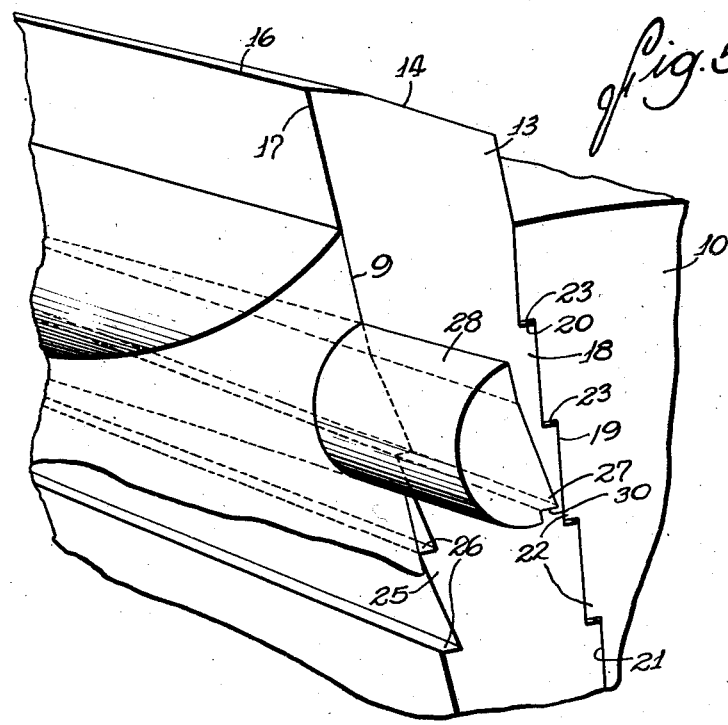
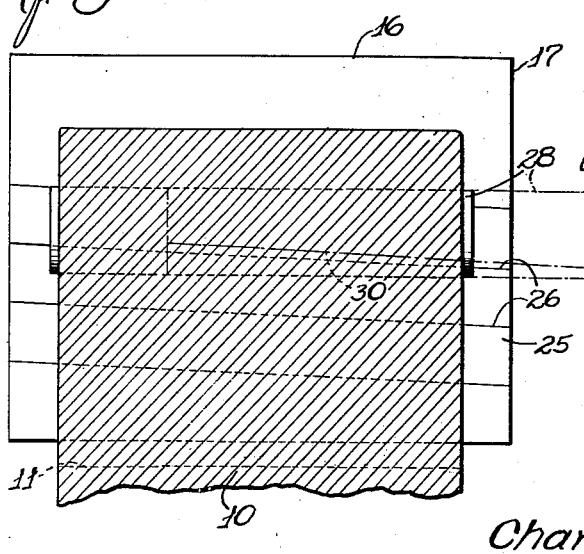
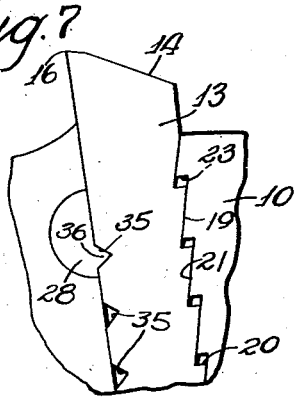
INVENTOR
Charles E. Kraus Patented Sept. 26, 1939

2,173,848

UNITED STATES PATENT OFFICE 2,173,848

CUTTER AND BLADE THEREFOR

Charles E. Kraus, Rockford, Ill., assignor to The Ingersoll Milling Machine Company, Rockford, Ill., a corporation of Illinois Application December 27, 1937, Serial No. 181,749

13 Claims. (Cl. 29—105)

This invention relates to inserted blade cutters, the blades of which may be adjusted for wear in one or more directions.

The general object is to provide in a cutter of the above character a new and improved blade mounting which provides for adjustment of the blade for wear in a novel manner, which is of inexpensive construction and which provides an extremely positive and rugged lock for holding the blade against dislocation.

The invention also resides in the novel construction of the cutter blades.

Other objects and advantages of the invention will become apparent from the following detailed description taken in connection with the accompanying drawings, in which Figure 1 is a fragmentary end view of a milling cutter embodying the novel features of the present invention.

Figs. 2 and 3 are fragmentary perspective views of the cutter blades looking from opposite sides thereof.

Fig. 4 is a perspective view of one of the parts of the blade lock.

Fig. 5 is a fragmentary perspective view with the blade and locking member in released position.

Fig. 6 is a section taken along the line 6—6 of Fig. 1.

Fig. 7 is a fragmentary end view of a modified form of blade and its mounting.

While the invention is susceptible of various modifications and alternative constructions, I have shown in the drawings and will herein describe in detail the preferred embodiments. It is to be understood that I do not thereby intend to limit the invention by such disclosure, but aim to cover all modifications and alternative constructions falling within the spirit and scope of the invention as expressed in the appended claims.

In the form selected for purposes of illustration, the invention is embodied in a rotary face milling cutter comprising a cylindrical body 10 formed around its periphery with annularly spaced slots or recesses 12 for receiving blades 13. The recesses are defined by a bottom wall 11 and opposed leading and trailing side walls 8 and 9 which are disposed substantially parallel to each other. In this instance, the recesses open outwardly in directions both radially and axially of the body.

The blades 13 each comprise a flat block of metal of substantially uniform thickness. One edge 14 and one end 15 slope to intersecting cutting edges 16 and 17, the shape and relative positions of which are determined by the character of the work to be performed.

To enable the blade to be wedged into and firmly locked in its slot and at the same time provide for outward step-by-step adjustment for wear occurring on the primary edge 16, a plurality of spaced projections 18 are formed on one side of the block. Each of these has a substantially flat wedge surface 19 facing away from the cutting edge 16 and inclined at an effective wedging angle, for example, seven degrees, to the plane of the blade or to the side thereof opposite that on which the projections 18 are formed. Thus, the surfaces 19 are disposed in spaced parallel planes indicated by dotted lines in Fig. 1 and converging toward the plane of the cutting edges in a direction away from the edge 16 and toward the bottom of the blade slot. That is to say, the planes of the wedge surfaces intersect the plane of the opposite side face of the blade at points spaced from the wedge surfaces and disposed on the side thereof opposite the cutting edge to be adjusted outwardly through the medium of the wedge surfaces. The adjacent steps terminate at abrupt transverse shoulders 20 which face outwardly.

The wedge surfaces 19 cooperate with complemental surfaces 21 formed on projections 22 integral with the cutter body and extending into the blade recess from the trailing wall 8 thereof. These projections are of course spaced and shaped to correspond to the projections 18 and have shoulders 23 between them which face toward the bottom of the slot.

The blade thus constructed may be moved endwise into its slot when the projections 18 thereon are in register with the complemental grooves defined by the adjacent surfaces 21 and 23 of the body projections 22, this position being shown in Fig. 5. Then, forcing the blade inwardly in a radial or edgewise direction, the surfaces 19 and 21 interengage as shown in Fig. 1 causing the blade to be wedged against the opposite wall 9 of the blade slot. By employing stepped wedge surfaces which engage as the blade is forced inwardly, the blade may be adjusted outwardly for wear in increments determined by the pitch of the projections 18. To effect such adjustment, the blade is released and removed, set outwardly one step, reinserted in its slot and again wedged in place. By extending the wedge surfaces 19 and 21 generally longitudinally of the cutting edge to be adjusted, the forces acting on this edge in service use tend to increase the wedging action.

To positively lock the wedge blade against endwise movement and also edgewise tilting in its slot, the leading side face of the blade is formed with configurations which are correlated in construction with the wedge projections 18. In the present instance, these configurations comprise parallel ribs 25 formed integral with the blade and providing shoulders 26 facing outwardly toward the cutting edge 16. The shoulders are spaced apart distances equal to the pitch of the wedge projections 18 and preferably extend at a small angle (see Figs. 3 and 6) relative to the projections and the edge 16. The shoulders coact with a rib 27 on an elongated pin 28 insertable endwise in a slot 29 formed in the side wall 9 of the blade recess and opening laterally into the latter. Herein, the pin is semi-circular in cross-section and the rib 27 is formed with a shoulder 30 facing toward the bottom of the blade recess and positioned to overlie one of the shoulders 26 on the blade substantially through the length of the latter in the wedged position of the blade, the shoulder 30 thus being inclined relative to the pin.

Preparatory to inserting the blade, the pin 28 is placed against the blade with the rib 27 overlying one of the ledges 26 corresponding to the position in which the blade is to be inserted in the body and with the end of the pin projecting beyond the blade as indicated in dot-dash outline in Fig. 6. The two are then moved endwise into the blade and pin recesses as illustrated in Fig. 5 until the blade reaches the desired position. Finally, the pin is moved relative to the blade to the full line position shown in Fig. 6. During this movement, the rib 27 engages the adjacent ledge 26 and forces the blade edgewise and downwardly into its recess until the surfaces 19 and 21 become firmly wedged together as shown in Fig. 1. The blade is thus positively locked by the pin against edgewise tilting and also clamped against endwise movement.

To adjust the blade outwardly, the pin and blade are first released and removed from the body. This is accomplished by driving a wedge pin or so-called drift in between the inner edge of the blade and the bottom 11 of its recess. Then, the pin is positioned for engagement of its rib 27 with the next lower ledge 26 after which the blade and pin are reinserted in the manner described above.

Instead of shaping the locking configurations on the leading face of the blade in the manner described above, grooves 35 may be formed on this face as shown in Fig. 7 and inclined at the same angle as the projections 25. The grooves are pitched to correspond to the wedge surfaces 19 and are adapted to receive a rib 36 on the pin 28 and of a shape complemental to the grooves. The blade thus constructed is locked in the cutter body and adjusted outwardly the same as the blade first described. By making the rib 36 V-shaped, it will act in either direction on the blade thereby enabling the wedging action on the blade to be released simply by driving out the pin 28.

In some rotary cutters, the main cutting edge 16 will extend transversely of the rotational axis of the cutter body instead of longitudinally thereof as in the exemplary cutter shown. For such cutters, the wedge surfaces preferably would also be extended along the end face of the body so as to extend generally longitudinally of the cutting edge to be adjusted for wear.

I claim as my invention:

1. A cutter comprising, in combination, a body having an outwardly opening blade recess therein, a blade disposed in said recess with one marginal edge portion projecting therefrom, a cutting edge formed on said edge portion, interfitting and complemental projections on one side of said blade and one wall of said recess providing stepped wedge surfaces extending longitudinally of said edge and arranged to wedge together as the blade is forced into said recess edgewise of said edge, said projections being adapted to interfit in a plurality of different lateral positions of said edge, parallel ribs on the opposite side of the blade extending longitudinally of but inclined relative to said projections and spaced to correspond to the pitch of said projections, and a pin inserted endwise in said body and engageable with one of said ribs to move the blade inwardly and wedge said projections together.

2. A cutter comprising, in combination, a body having a blade recess therein opening at one side and one end, a blade disposed in said recess with one marginal edge portion projecting therefrom, a cutting edge formed on said edge portion, interfitting and complemental projections on one side wall of said recess and said blade providing stepped wedge surfaces disposed in parallel planes converging at a wedging angle toward the opposite recess wall and away from said edge so as to wedge together as the block is forced edgewise into said recess, and configurations on the opposite side of the blade and said body engageable in different positions of adjustment of said edge and operating to hold the blade positively against edgewise tilting.

3. A cutter comprising, in combination, a body having a blade recess therein opening at one side and one end, a blade disposed in said recess with one marginal edge portion projecting therefrom, a cutting edge formed on said edge portion, complemental stepped wedge surfaces on one side of said blade and one wall of said recess disposed in parallel planes converging at a wedging angle away from said edge and toward the opposite side of the blade whereby to wedge together as the blade is forced into said recess edgewise of said surfaces, a member adapted to be inserted between the opposite side of the blade and said body in a direction longitudinally of said projections, and configurations on said blade cooperating with said member in different positions of adjustment of said edge to lock the blade against release of said wedge surfaces and thereby hold the blade against edgewise tilting.

4. A cutter comprising, in combination, a body having a blade recess therein opening at one side and one end, a blade disposed in said recess with one marginal edge portion projecting therefrom, a cutting edge formed on said edge portion, complemental stepped wedge surfaces on one side of said blade and one wall of said recess adapted to interfit in a plurality of different lateral positions of said edge and disposed in parallel planes converging at a wedging angle away from said edge and toward the opposite side of the blade whereby to wedge together as the blade is forced into said recess edgewise of said surfaces, and means acting positively on said blade to hold the latter against endwise movement or edgewise tilting when said surfaces are wedged together.

5. A cutter comprising, in combination, a body having a blade recess therein opening at one side and one end, a blade disposed in said recess with one marginal edge portion projecting therefrom, a cutting edge formed on said edge portion, complemental stepped wedge surfaces on one side of said blade and one wall of said recess disposed in parallel planes adapted to wedge together as the blade is forced edgewise into said recess, a plurality of configurations on the opposite side of the blade extending longitudinally of said wedge surfaces and laterally spaced to correspond to the pitch of the surfaces, and means on said body coacting with said configurations to hold the blade against edgewise tilting when said surfaces are wedged together.

6. A cutter comprising, in combination, a body having a blade recess therein opening at one side and one end, a blade disposed in said recess with one marginal edge portion projecting therefrom, a cutting edge formed on said edge portion, complemental stepped wedge surfaces on one side of said blade and one wall of said recess adapted to interfit in a plurality of different positions of said blade spaced away from the bottom of said recess whereby to permit of adjustment of said edge for wear, said surfaces wedging together as the blade is forced edgewise into said recess from any of said different positions, and means on said body coacting with one side of said blade in said different positions to hold the blade against edgewise tilting when said surfaces are wedged together.

7. A cutter blade comprising a block of material having opposite parallel faces, an edge surface sloping toward a cutting edge disposed substantially in the plane of one of said faces, projections on the other of said faces extending generally longitudinally of said edge and providing stepped wedge surfaces disposed in parallel planes converging at a wedging angle toward said first face and away from said edge, and parallel ribs on said first face extending longitudinally of said projections but at a small angle thereto and providing shoulders facing toward said edge and spaced to correspond to the pitch of said projections.

8. A cutter blade comprising a block of material having opposite substantially parallel faces, an edge surface sloping toward a cutting edge disposed substantially in the plane of one of said faces, projections on one of said faces providing stepped wedge surfaces disposed in parallel planes converging at a wedging angle toward the other face of said block and away from said edge, and parallel configurations on said other face extending longitudinally of said first projections and providing shoulders facing toward said edge and spaced to correspond to the pitch of said projections.

9. A cutter blade comprising a block of material having opposite parallel faces, an edge surface sloping toward a cutting edge disposed substantially in the plane of one of said faces, configurations on the other of said faces providing stepped wedge surfaces disposed in parallel planes converging at a wedging angle toward said first face and to a marginal edge of said block opposite said edge, and configurations on said first face extending longitudinally of said first projections and spaced to correspond to the pitch of said first configurations.

10. A cutter blade comprising a block of material adapted to provide a cutting edge, stepped wedge surfaces on one side of said block extending generally longitudinally of said edge and disposed in parallel planes converging at a wedging angle toward the opposite side of said block and away from said edge, and configurations on said opposite side spaced to correspond to the pitch of said surfaces.

11. A cutter blade comprising a block of material having one marginal edge portion adapted to provide a cutting edge and projections on one side thereof providing stepped wedge surfaces disposed in parallel planes converging toward the opposite side of the block and away from said edge.

12. A cutter blade comprising a block of material adapted to provide a cutting edge along one margin, projections on one side of said block providing stepped wedge surfaces disposed in parallel planes converging toward the opposite side of the block and away from said edge, and locking configurations on said opposite side of the block.

13. A cutter blade comprising a block of material providing a cutting edge along one margin, and means on one side face of said block providing a plurality of stepped wedge surfaces intersecting the plane of the opposite side face of the block at points spaced farther from said edge than said surfaces.

CHARLES E. KRAUS.